United States Patent [19]

Obayashi et al.

[11] Patent Number: 4,503,713
[45] Date of Patent: Mar. 12, 1985

[54] DUAL SENSITIVITY TORQUE DETECTOR

[75] Inventors: Hideki Obayashi, Okazaki; Tokio Kohama, Nishio; Kimitaka Saito, Okazaki; Hisasi Kawai, Toyohashi; Toshikazu Ina, Nukata, all of Japan

[73] Assignee: Nippon Soken, Inc., Nishio, Japan

[21] Appl. No.: 486,832

[22] Filed: Apr. 20, 1983

[30] Foreign Application Priority Data

Apr. 22, 1982 [JP] Japan .................................. 57-67548

[51] Int. Cl.³ ............................................... G01L 3/02
[52] U.S. Cl. ............................... 73/862.34; 73/862.22
[58] Field of Search ........... 73/862.22, 862.32, 862.33, 73/862.34

[56] References Cited

U.S. PATENT DOCUMENTS

| 3,194,065 | 7/1965 | Wilson | 73/862.34 |
| 3,304,772 | 2/1967 | Cambell | 73/862.22 |

FOREIGN PATENT DOCUMENTS

| 56-133637 | 10/1981 | Japan | 73/862.34 |
| 723407 | 3/1980 | U.S.S.R. | 73/862.33 |

Primary Examiner—Charles A. Ruehl
Assistant Examiner—Brian R. Tumm
Attorney, Agent, or Firm—Cushman, Darby & Cushman

[57] ABSTRACT

A torque detector, particularly a torque detector for detecting a torque applied to a torque transmission shaft which is connected to a load such as a wheel of an automobile, comprises a first shaft connected to a driving shaft, a second shaft connected to a torque transmission shaft, and a plurality of elastic members, each of which is interposed between the first shaft and the second shaft for transmitting the torque of the first shaft to the second shaft while receiving the compression force between the first shaft and the second shaft when the driving shaft is driven. The first shaft comprises a flange portion wherein a plurality of long grooves are formed so as to extend in the rotating direction thereof. The second shaft comprises a flange portion wherein a plurality of long holes are formed so as to extend in the rotating direction thereof and penetrate therethrough at such positions as to be substantially opposed to said long grooves. Each of the elastic members is accommodated within each of the long holes. The projecting side portion of each of the elastic members is accommodated within each of the long grooves. The long holes are grouped into two kinds of long holes having different lengths in the rotating direction of the second shaft. One kind of long holes have a length equal to that of the long groove of the first shaft while the other kind of long holes have a length longer than that of one kind of long holes by a predetermined angular distance. Until the applied torque reaches a predetermined value, the first shaft is connected to the second shaft only through one kind of elastic members to decrease the total spring constant thereof and when the applied torque exceeds the predetermined value, the first shaft is connected to the second shaft through all of the elastic members to increase the total spring constant thereof. The torque detector further comprises a data processor by which the angular phase difference between the first shaft and the second shaft, which occurs due to the compression of the elastic members is detected and torque is calculated from the detected angular phase difference.

10 Claims, 8 Drawing Figures

F I G.1
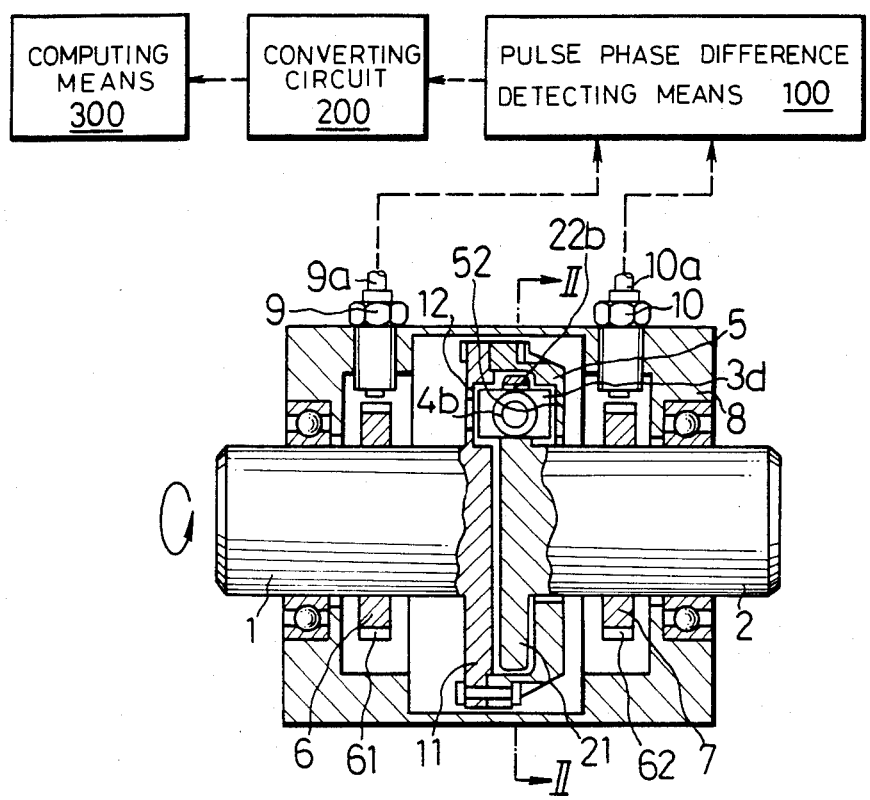
F I G.2
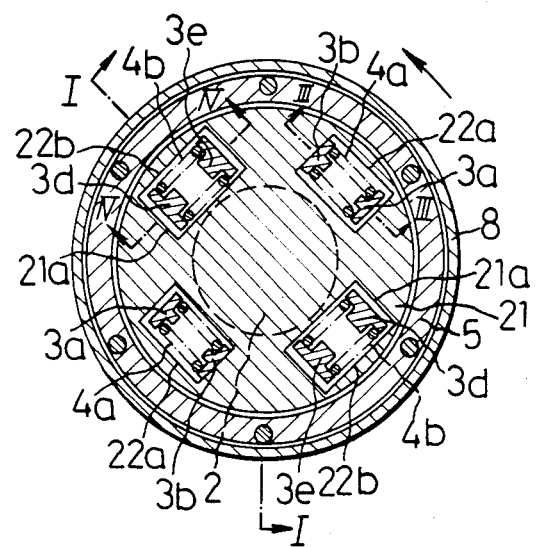

SMALL ← TORQUE → LARGE

ANGULAR PHASE DIFFERENCE (°)

ANGULAR PHASE DIFFERENCE (°)

DUAL SENSITIVITY TORQUE DETECTOR

BACKGROUND OF THE INVENTION

The present invention relates to a torque detector, particularly to a torque detector for detecting a torque applied to a torque transmission shaft which is connected to a load such as a wheel of an automobile.

The conventional torque detector of this type is provided with a detector shaft of which one end is connected to a driving shaft of an engine and the other end is connected to the torque transmission shaft. In this torque detector, the torque applied to the torque transmission shaft is detected by detecting the distortion occurring in the above detector shaft.

The distortion of the above shaft is detected by a detecting means of a strain gauge type comprising a strain gauge of which electric resistance varies in proportion to the distortion, of a magnetic strain type comprising a magnetic strain pipe of which magnetic property varies in accordance with the distortion or of a phase difference type, which detects a phase difference between the distortion occurring at two separated points of the detector shaft.

However, the conventional torque detector having the above structure is large in size and complex in structure. Namely, in the conventional torque detector, the torque is detected by detecting distortion occurring in the detector shaft so that if the detector shaft is short, the accuracy of the detection is low. Therefore, in order to improve the accuracy of the detection, the detector shaft must be made long.

It has been required to control the ignition timing, the air-fuel ratio and the gear ratio of the transmission of the automobile in accordance with the torque applied to the load.

However, the above described conventional torque detector is too large and too complex in structure to be mounted on the automobile practically.

Accordingly, one object of the present invention is to provide a torque detector which is small in size and simple in structure enough to be mounted on an automobile.

Another object of the present invention is to provide a torque detector for detecting the torque by detecting the angular phase difference between the driving shaft and the torque transmission shaft which is changed in response to the applied torque.

Still another object of the present invention is to provide a torque detector by which the torque can be precisely detected in the ordinary torque range and also when the torque exceeds the upper limit of the ordinary torque range, excess phase delay of the second shaft relative to the first shaft can be prevented.

SUMMARY OF THE INVENTION

The torque detector of the present invention comprises a first shaft connected to a driving shaft, a second shaft connected to a torque transmission shaft, at least one elastic member which is interposed between the first shaft and the second shaft for transmitting the torque of the first shaft to the second shaft while receiving the compression force between the first shaft and the second shaft when the driving shaft is driven, a means for making the total spring constant of the elastic member relatively small until the torque reaches a predetermined value and making the total spring constant thereof relatively large when the torque exceeds the above predetermined value, an angular phase difference detecting means for detecting the angular phase difference occurring between the first shaft and the second shaft due to the compression of the elastic member and a computing means for calculating torque from the detected angular phase difference. The angular phase difference detecting means comprises a pulse generating means for generating a pulse every predetermined rotating angle of each of the first and second shafts, a pulse phase difference detecting means for detecting the phase difference between the generated pulses and a converting circuit for converting the phase difference into the angular phase difference.

When the torque is not more than the predetermined value of torque, the total spring constant of the elastic member is made relatively small so that a large phase difference occurs between the first shaft and the second shaft. Therefore, high torque detecting precision can be obtained. And when the torque exceeds the predetermined value of torque, the total spring constant of the elastic member is made relatively large so that the increasing ratio of the angular phase difference becomes smaller than that of the applied torque. Therefore, excess phase delay does not occur in the torque transmission shaft.

BRIEF DESCRIPTION OF THE DRAWINGS

FIG. 1 is a longitudinal sectional view of an embodiment of a torque detector according to the present invention taken along the line I—I of FIG. 2;

FIG. 2 is a transverse sectional view taken along the line II—II of FIG. 1;

DETAILED DESCRIPTION OF EMBODIMENTS

Figure 3:
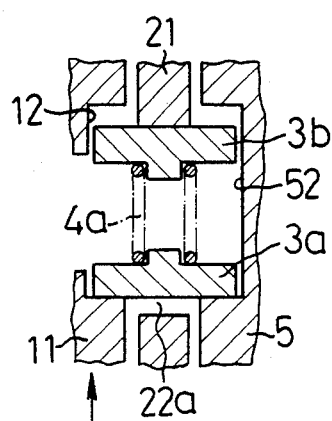
FIG. 3 is a longitudinal sectional view of one of a first kind of elastic members taken along the line III—III of FIG. 2.

Hereinafter, the present invention will be explained in accordance with several embodiments thereof with reference to the accompanying drawings.

As shown in FIG. 1, shafts 1, 2 are coaxially arranged within a stationary casing 8 so as to be opposed to each other and they are rotatably supported thereby.

One end of the shaft 1 is connected to a power source outside of the casing 8 while one end of the shaft 2 is connected to a load outside of the casing 8.

A thick walled flange 21 is formed in the other end of the shaft 2 so as to be opposed to the other end of the shaft 1.

In the other end of the shaft 1, a flange 11 is formed so as to be opposed to the flange 21 of the shaft 2.

A coupling flange 5 is fixed to the outer periphery of the flange 11 by means of rivets so as to cover the flange 21.

As shown in FIGS. 1, 2, one pair of long holes 22a and another pair of long holes 22b are formed in the flange 21 of the shaft 2. Each of the long holes 22a, 22b extends in the circumferential direction. The long holes 22a are opposed to each other in the radial direction while the long holes 22b are opposed to each other in the radial direction.

These four long holes 22a, 22b are arranged alternately in the circumferential direction of the flange 21 at regular distances. A coil spring 4a is accommodated within each of the long holes 22a while a coil spring 4b is accommodated within each of the long holes 22b. Both ends of the coil spring 4a are supported by spring receiving members 3a, 3b while both ends of the coil spring 4b are supported by spring receiving members 3d, 3e.

The length of the long holes 22b in the circumferential direction is made longer than that of the long holes 22a.

In the flange 11, grooves 12 are formed so as to be opposed to the long holes 22a, 22b while in the coupling flange 5, grooves 52 are formed so as to be opposed to the long holes 22a, 22b.

The grooves 12 and the grooves 52 extend in the circumferential direction and have a circumferential length equal to that of the long holes 22a.

The spring constant of each spring 4b which is provided in each long hole 22b is made larger than that of the spring 4a which is provided in the long hole 22a.

To the outer periphery of the shafts 1, 2, annular plates 6, 7 are fixed, respectively. In the outer peripheral surface of each of the annular plates 6, 7, a plurality of teeth 61, 62 are formed at equal angular distances.

An electromagnetic pickups 9, 10 which act as pulse generating means, are provided in the casing 8 so as to be opposed to the teeth 61, 62, respectively. The pickups 9, 10 detect the passing of the teeth 61, 62 and generate electrical signals. The generated electrical signals are supplied to a pulse phase difference detecting means 100 by way of lead wires 9a, 10a. The pulse phase difference detecting means 100 is electrically connected to a converting circuit 200 for converting the phase difference into the angular phase difference. The converting circuit 200 is electrically connected to a computing means 300 for calculating torque from the angular phase difference.

Figure 4:
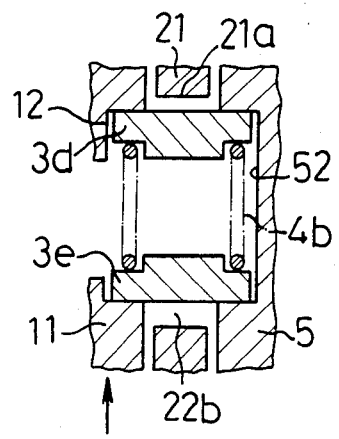
FIG. 4 is a longitudinal sectional view of one of a second kind of elastic members taken along the line IV—IV of FIG. 2.

In operation, when the shaft 1 is rotated in the direction of the arrow shown in FIGS. 2, 3, 4, one end surface defining each groove 12 of the flange 11 of the shaft 1 and one end surface defining each groove 52 of the coupling flange 5 connected to the flange 11 push the spring receiving members 3a, 3e as shown in FIGS. 3 and 4.

When the applied torque is not more than a predetermined value, the rotating force of the shaft 1 is applied to the flange 21 of the shaft 2 only through the spring receiving members 3a, the springs 4a having a small spring constant, and the spring receiving members 3b. As a result, the shaft 2 starts rotating. However, at this time, each spring receiving member 3d which receives the spring 4b does not abut on the end surface 21a defining each long hole 22b of the flange 21, which is apart from the end surfaces defining each groove 12 and each groove 52 by a predetermined angular distance as shown in FIG. 4.

Therefore, the rotating force of the shaft 1 is not transmitted to the flange 21 through the spring receiving members 3e, the springs 4b and the spring receiving members 3d.

Consequently, when the applied load is not more than a predetermined value, only the springs 4a are compressed so that the angular phase difference in response to the compression volume of the springs 4a occurs between the shaft 1 and the shaft 2.

As the applied torque increases, the springs 4a are compressed furthermore and the flange 11 and the coupling flange 5 advance relative to the flange 21. And when the applied torque reaches the predetermined value, each spring receiving member 3d abuts on the end surface 21a of the flange 21 so that the torque is transmitted to the flange 21 through the springs 4b as well as the springs 4a.

As a result, the total spring constant applied to the flange 21 becomes large, so that the compressing ratio of the springs does not largely increase when the applied torque exceeds the predetermined value.

Figure 5:
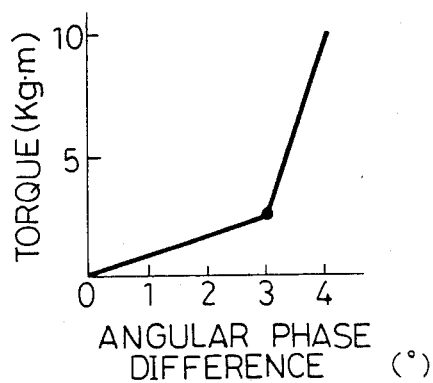
FIG. 5 is a graph showing the relation between the applied torque and the phase difference between the first shaft and the second shaft of the present invention.

FIG. 5 shows the relation between the applied torque and the angular phase difference between the first shaft and the second shaft of the present invention.

When the torque is within the range of ordinary use, the increasing ratio of the angular phase difference to the applied torque is very large so that the torque can be detected with high precision.

When the torque exceeds the upper limit of the above range, the increasing ratio of the angular phase difference to the applied torque becomes small so that excess delay of the phase difference can be prevented from occurring in the second shaft connected to the torque transmission shaft, and also the durability of the springs is improved.

Figure 6:
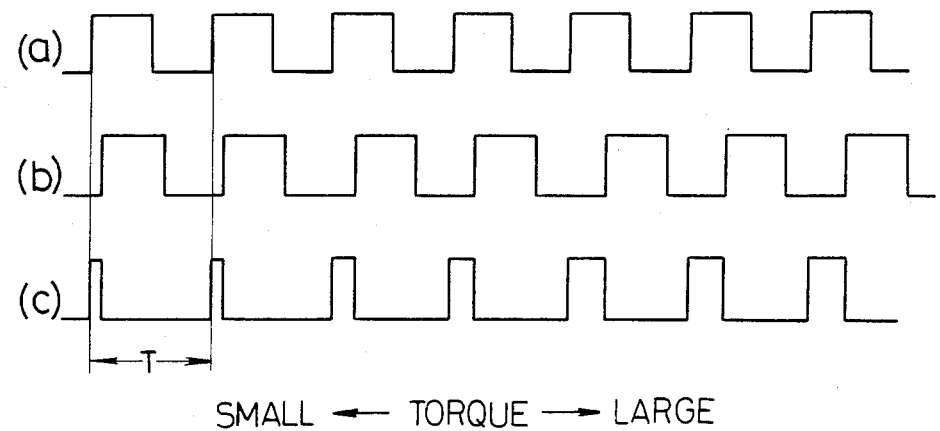
FIG. 6 is a wave form diagram of output signals of the angular phase difference detecting means and the data processor.

FIG. 6 is a wave form diagram of output signals of the electromagnetic pickups 9, 10. The electromagnetic pickup 9 generates the output signal having the pulse wave form (a) and the electromagnetic pickup 10 generates the output signal having the pulse wave form (b).

When torque is applied to the shaft 2, the phase of the output signal of the pickup 10 delays in accordance with the applied torque.

Then, the pulse phase difference detecting means 100 processes the output signals having the wave forms (a), (b), and generates the torque signal having the pulse wave form (c) of which pulse width is equal to the phase difference between the pulse wave forms (a) and (b).

The converting circuit 200 calculates the rotating speed of the shafts 1 and 2 from the period T of the torque signal and obtains angular phase difference by adjusting the pulse phase difference in consideration of the calculated rotating speed. Then, the computing means 300 calculates the precise torque from the angular phase difference.

Figure 7:
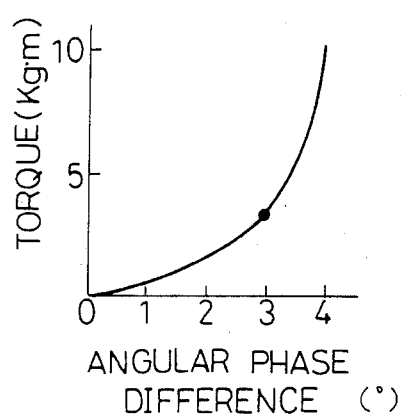
FIG. 7 is a graph showing the relation between the applied torque and the angular phase difference when all elastic members are formed of rubber.

The elastic member can be formed of rubber or elastic resin instead of coil spring. In this case, the compression volume of the elastic members, namely the phase difference between the shaft 1 and the shaft 2 is non-linearly changed in accordance with the increase of the applied torque as shown in FIG. 7.

Figure 8:
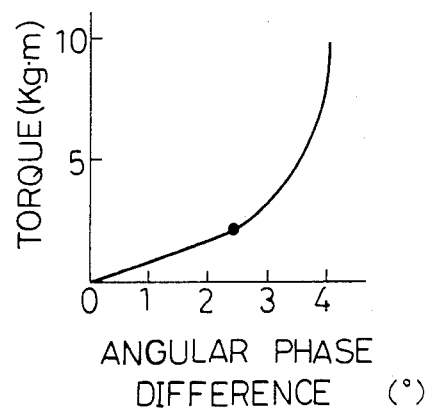
FIG. 8 is a graph showing the relation between the applied torque and the angular phase difference when the first kind of elastic members are formed of coil springs while the second kind of elastic members are formed of rubber.

Only the elastic members for applying pushing force to the shaft 2 after the torque reaches a predetermined level can be formed of rubber while as the other elastic members, coil springs are used. In this case, the compression volume of the elastic members is non-linearly changed in accordance with the increase of the applied torque as shown in FIG. 8.

In the above embodiment, the spring constant of each of the elastic members for applying pushing force afterwards is made larger than that of each of the elastic members for applying pushing force beforehand.

Instead, the spring constant of two kinds of elastic members may be equal to each other.

In the above embodiment, the total spring constant of the elastic members has been changed by using two kinds of elastic members which apply torque to the second shaft at different timings.

Instead, by changing the spring constant of each of the elastic members in two steps, the same operation effect can be obtained. For example, a radially extending projection is formed in the central portion of the coil spring and a stopper is provided in the coupling flange for abutting on the projection when the coil spring is compressed by a predetermined amount. When the projection abuts on the stopper, one portion of the spring is prevented from being compressed furthermore so that the spring constant of each coil spring can be increased.

In the above embodiment, the total spring constant of the elastic members is changed in two steps.

In addition, by using not less than three kinds of elastic members which apply torque to the second shaft at different timings, the total spring constant of the elastic members can be changed in not less than three steps.

The angular phase difference detecting means can detect the angular phase difference electromagnetically or photoelectrically. Otherwise, an oscillator or a semiconductor can be employed. The above-described pulse phase difference detecting means, the converting circuit and the computing means can be practically embodied in the soft ware of a data processor.

As described above, the torque detector of the present invention is characterized in that torque is detected by interposing an elastic member between a shaft on a driving side and a shaft on a load side, and by detecting angular phase difference between both shafts due to the compression of the elastic member which occurs when a rotating force of the shaft on the driving side is transmitted to the shaft on the load side through the elastic member.

The torque detector of the present invention having the above described structure can be made remarkably small as compared with the conventional detector which detects torque by providing another shaft between the above two shafts coaxially and detecting the distortion occurring in another shaft.

Furthermore, in the torque detector of the present invention, the total spring constant of the elastic member interposed between the shaft on a driving side and the shaft on a load side is made small until the compressing volume of the elastic member, namely, the angular phase difference between both shafts reaches a predetermined level, and made large after the compressing volume of the elastic member exceeds the above predetermined level. Therefore, the detecting precision can be made high especially in the ordinary use range and excess angular phase delay is prevented from occurring in the shaft on a load side. In addition, fatigue or damage of the elastic member due to excess compression can be prevented.

What is claimed is:

1. A torque detector comprising:

a first shaft integrally connected to a driving shaft of an internal combustion engine so as to be rotated therewith:

a second shaft connected to a load, said second shaft being arranged so as to be coaxial with and opposed to said first shaft;

a plurality of elastic members which are interposed between said first shaft and said second shaft for transmitting the torque of said first shaft to said second shaft while being compressed between said first shaft and said second shaft;

a spring constant changing means for making the total spring constant of said elastic members relatively small until the applied torque reaches a predetermined value and making the total spring constant thereof relatively large when the applied torque exceeds the predetermined value;

said spring constant changing means being formed in said second shaft for enabling one part of said elastic members to connect said first shaft to said second shaft until the applied torque reaches said predetermined value and enabling said one part and another part of said elastic members to connect said first shaft to said second shaft when the applied torque exceeds said predetermined value;

an angular phase difference detecting means for detecting angular phase difference between said first and second shafts during the rotation thereof; and a computing means for calculating torque from the angular phase difference.

2. A torque detector according to claim 1, wherein:
said elastic member is formed of a member selected from the group consisting of a compression spring, rubber block and elastic resin block.

3. A torque detector according to claim 1, wherein:
each of said elastic members has an equal spring constant.

4. A torque detector according to claim 1, wherein:
said elastic members are composed of at least two kinds of elastic members having different spring constants; and
said one part of elastic members have a spring constant smaller than that of said another part of elastic members.

5. A torque detector according to claim 1, wherein:
said first shaft is provided with a flange portion;
said second shaft is provided with a flange portion which is opposed to said flange portion of said first shaft; and
said elastic members are arranged in the rotating direction of said shafts between said flange of said first shaft and said flange of said second shaft.

6. A torque detector according to claim 5, further comprising:
a coupling flange which is integrally connected to said flange portion of said first shaft so as to be opposed thereto while interposing said flange portion of said second shaft;
wherein the spring constant changing means includes:
elastic member retaining portions which are long grooves extending in the rotating direction of said first shaft;
elastic member receiving portions which are long holes which are formed so as to penetrate said flange portion of said second shaft and extends in the rotating direction thereof;

said coupling flange has grooves which are opposed to said grooves of said first shaft;
said elastic members are accomodated within said grooves and said long holes;
the length of said grooves of said first shaft in the rotating direction thereof is equal to that of said grooves of said coupling flange;
said long holes formed in said flange portion of said second shaft is composed of at least two kinds of long holes having different lengths in the rotating direction of said shaft;
one kind of long holes have a length equal to that of said groove of said first shaft while the other long holes have lengths longer than that of said one kind of long holes by a predetermined angular distance.

7. A torque detector according to claim 5, wherein the spring constant changing means includes:
a plurality of elastic member retaining portions, each of which is engaged with one end of each of said elastic members to rotate said elastic members with said first shaft, are formed in said flange portion of said first shaft in the circumferential direction thereof at predetermined angular distances;
a plurality of elastic member receiving portions, each of which receives the other end of each of said elastic members rotated by said retaining portions, are formed in said flange portion of said second shaft in the circumferential direction thereof;
said elastic member receiving portions are grouped into two kinds of elastic member receiving portions; and
each of one kind of elastic member receiving portions is apart from each of one group of said elastic member retaining portions by a predetermined angular distance while each of the other kind of said elastic member receiving portions is apart from the other group of said elastic member retaining portions by a predetermined angular distance larger than that between each of said one kind of said elastic member receiving portions and each of said one group of said elastic member retaining portions.

8. A torque detector according to claim 7, further comprising:
a coupling flange which is integrally connected to said flange portion of said first shaft so as to be opposed thereto while interposing said flange portion of said second shaft therebetween;
wherein said spring constant changing means includes;
said flange portion of said first shaft comprising a plurality of long grooves, each of which extends in the rotating direction thereof;
said flange portion of said second shaft comprising a plurality of long holes, each of which penetrates therethrough and extends in the rotating direction thereof so as to be substantially opposed to each of said grooves of said flange portion of said first shaft;
said coupling flange comprises a plurality of grooves, each of which is opposed to each of said grooves of said flange portion of said first shaft;
each of said elastic members is accommodated within each of said long holes so that both side portions thereof project on both sides of said flange of said second shaft while said projecting side portions of each of said elastic members are accommodated within each of said grooves of said flange portion of said first shaft and each of said grooves of said coupling flange;
said elastic member retaining portion is a back side end surface defining each of said grooves of said flange portion of said first shaft which extends in the rotating direction of said first shaft;
said elastic member receiving portion is a front side end surface defining each of said holes, which extends in the rotating direction of said second shaft;
the length of said grooves of said first shaft in the rotating direction thereof is equal to that of said grooves of said coupling flange;
said long holes formed in said flange portion of said second shaft are grouped into at least two kinds of long holes having different lengths in the rotating direction of said shaft;
one kind of long holes have a length equal to that of said groove of said first shaft while the other long holes have lengths longer than that of said one kind of long holes by a predetermined angular distance.

9. A torque detector according to claim 1, wherein:
said angular phase difference detecting means comprises:
a pulse generating means for generating a pulse every predetermined rotating angle of each of said first and second shafts;
a pulse phase difference detecting means for detecting the phase difference between the generated pulses; and
a converting circuit for converting said phase difference into the angular phase difference.

10. A torque detector according to claim 9, wherein:
said pulse generating means is composed of two annular members which rotate with said first and second shafts, respectively;
each of said annular members being provided with a plurality of teeth in the outer periphery thereof at predetermined angles; and
two electromagnetic pickups which are provided so as to be opposed to said teeth of said annular members, respectively.

* * * * *